March 3, 1964  R. N. KHARASCH ETAL  3,122,844
FLASH CARD TEACHING APPARATUS
Filed June 22, 1961  3 Sheets-Sheet 1
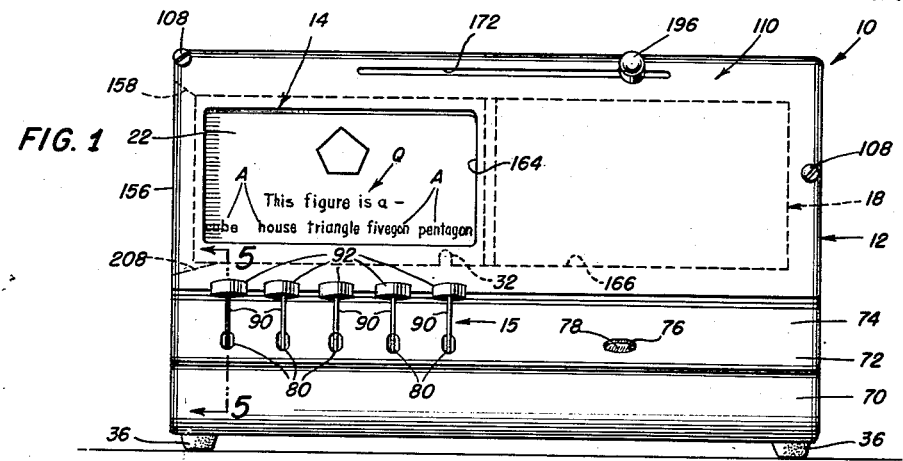
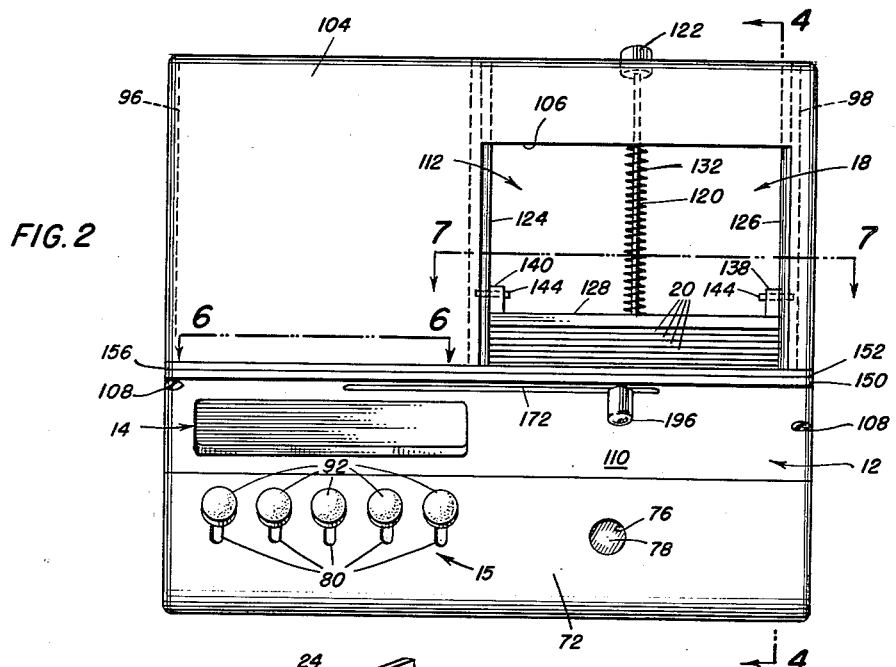
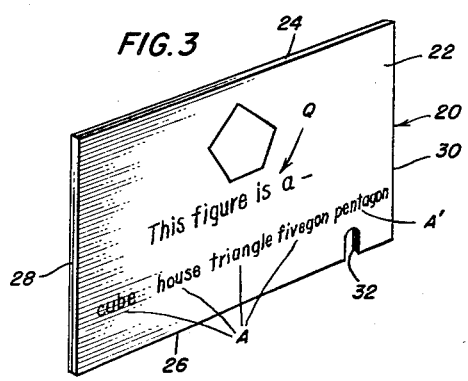
INVENTORS
Robert N. Kharasch
Richard A. Blanchette
BY
ATTORNEY March 3, 1964 R. N. KHARASCH ETAL 3,122,844
FLASH CARD TEACHING APPARATUS
Filed June 22, 1961 3 Sheets-Sheet 2
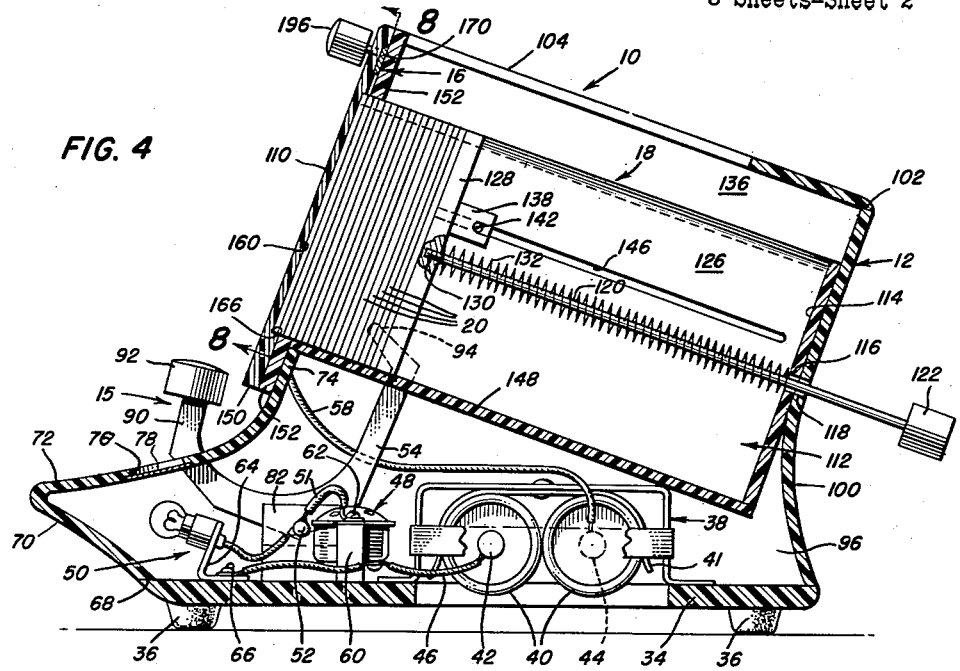
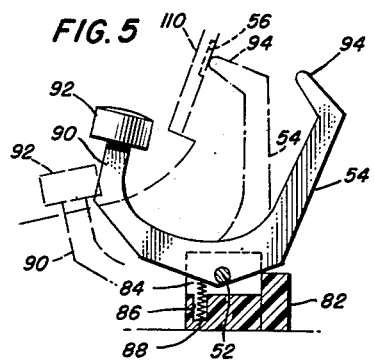
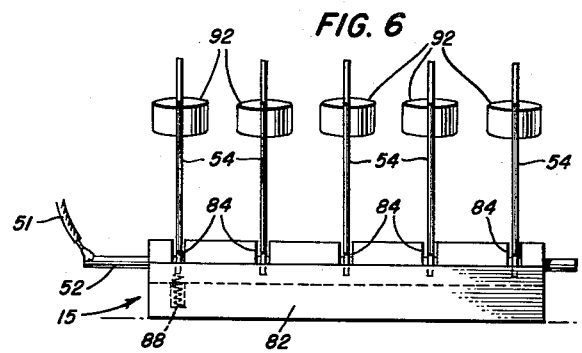
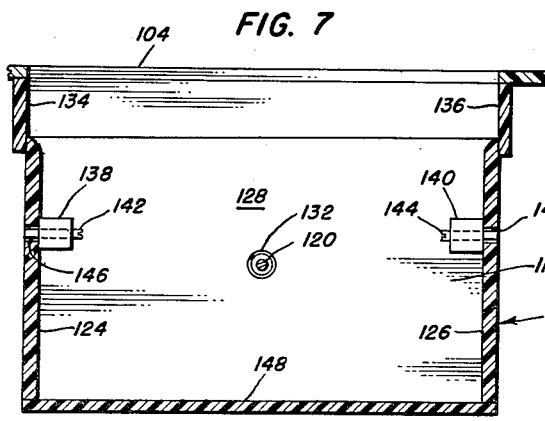
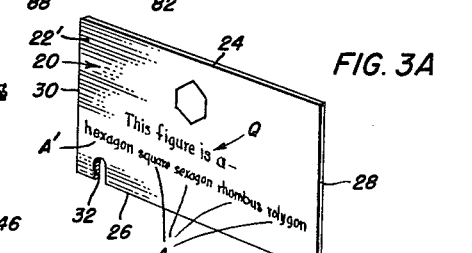
INVENTORS
Robert N. Kharasch
Richard A. Blanchette
BY Samuel M...
ATTORNEY

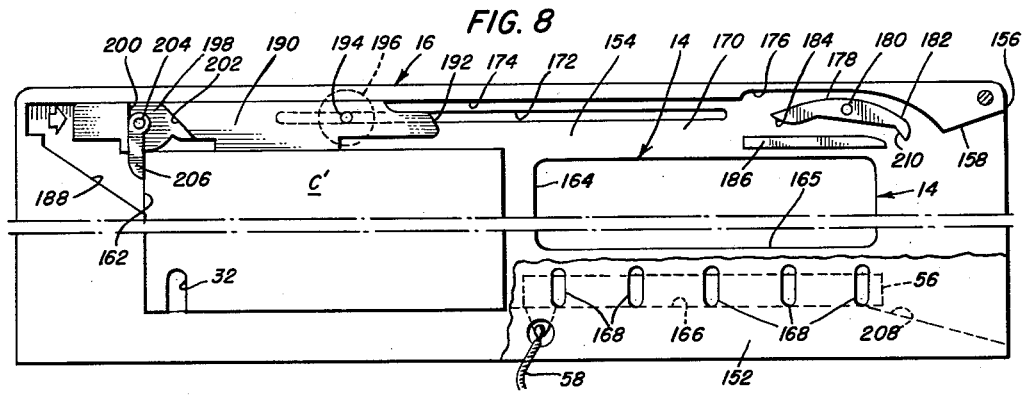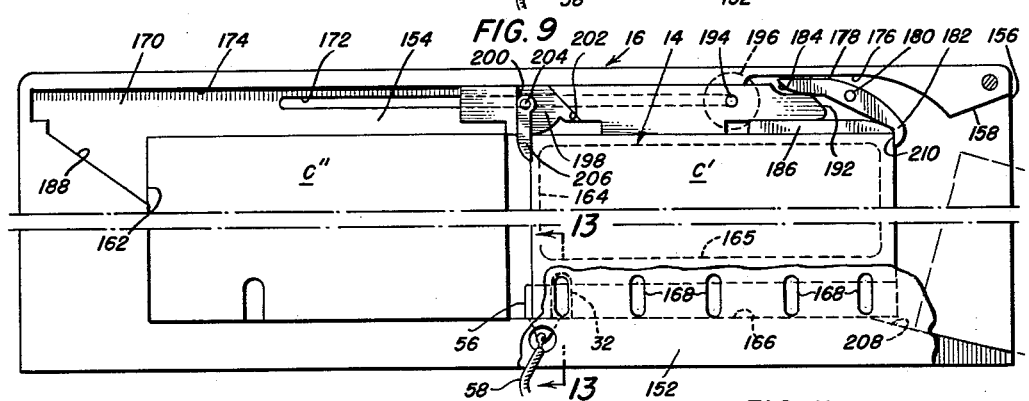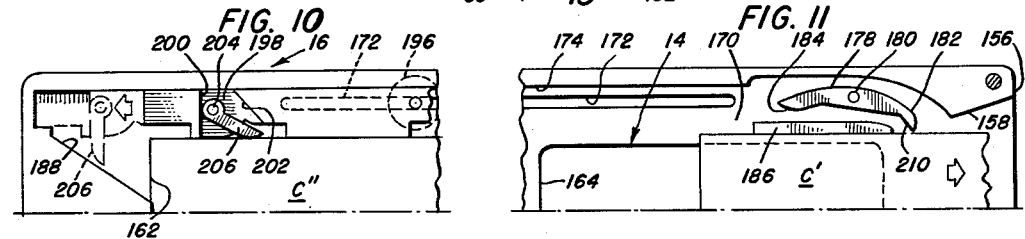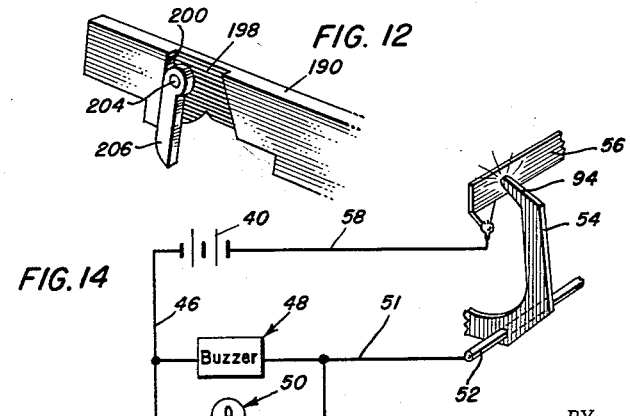
INVENTORS
Robert N. Kharasch
Richard A. Blanchette

3,122,844
FLASH CARD TEACHING APPARATUS
Robert N. Kharasch, 7300 Burdet Court, Bethesda, Md., and Richard A. Blanchette, Silver Spring, Md.; said Blanchette assignor to said Kharasch
Filed June 22, 1961, Ser. No. 118,820
11 Claims. (Cl. 35—9)

This invention relates generally to teaching apparatus and more particularly apparatus of the "flash card" type in which a series of cards are presented one at a time into view for the purpose of exhibiting a question to be correlated with an operator-selected, correct answer from a plurality of answers.

Flash cards per se are well known and old and although "flash cards" have become recognized as a valid teaching aid, require that someone work with a student whose knowledge is being tested.

Flash card devices for the purpose of presenting cards one-by-one to a student whereby a selected correct answer is indicated by signal means are not new.

The prior art apparatus has proved to be very expensive and complicated, and thus is not readily available to all those who would be benefitted.

A primary object of the present invention is to provide a novel quiz or flash-card apparatus which is entertaining are furthers the education of the user.

A further object of the invention is to provide a novel apparatus of the character mentioned in which a generous supply of quiz cards is supplied, both sides of the cards include test questions or indicia, and the cards are readily, expeditiously and positively oriented into the proper viewing position in the apparatus.

Another object of the invention is to provide means for supplying cards from a magazine to combined card-ejectment and card-orienting means whereby the apparatus may be utilized by one with relatively little coordination and skill, the apparatus being especially adapted for use by children as well as by adults.

Another object of the invention is to provide novel flash-card apparatus which orients and presents test cards one-by-one in an optimum position to be viewed, presents means for selecting an answer in a readily accessible and optimum position in alignment with selectable answers, and which provides means whereby cards can be changed or ejected from a viewing position with a minimum of effort and mechanical skill.

Other objects and the nature and advantages of the instant invention will be apparent from the following description taken in conjunction with the accompanying drawings, wherein:

FIG. 1 is a front elevation of the novel flash card apparatus;

FIG. 2 is a top plan view of FIG. 1;

FIGS. 3 and 3A are enlarged perspective views of a typical flash-card used in the apparatus, illustrating how both sides of the card can be utilized;

FIG. 4 is an enlarged vertical section taken substantially on line 4—4 of FIG. 2;

FIG. 5 is an enlarged fragmentary, vertical section taken substantially on line 5—5 of FIG. 1, portions being removed for purposes of clarity, and showing in phantom lines the alternate position of one of the circuit control switches of the apparatus;

FIG. 6 is a fragmentary rear elevation of the switch assembly of the apparatus as viewed substantially from line 6—6 of FIG. 2;

FIG. 7 is a fragmentary vertical section through the card magazine of the apparatus, taken substantially on line 7—7 of FIG. 2;

FIG. 8 is an enlarged rear elevation of the card orienting-and-ejectment mechanism, taken substantially on line 8—8 of FIG. 4, intermediate portions of the card and housing plate being removed;

FIG. 9 is a view similar to FIG. 8, showing a card moved to a viewing position and showing the manner in which a card is properly oriented into the viewing position;

FIG. 10 is a fragmentary view of a portion of FIGS. 8 and 9, showing the manner in which a gravity-responsive card-pickup finger moves on the upper edge of a next succeeding card from the position shown in FIG. 9 back to the position shown in FIG. 8;

FIG. 11 is a fragmentary portion of FIGS. 8 and 9, illustrating the manner in which the card-orienting latch moves from the position shown in FIG. 9 to that of FIG. 8 to permit the next succeeding card to be moved into an oriented position and cause the ejectment of a previously viewed card;

FIG. 12 is a fragmentary perspective view of the gravity-responsive card pickup finger;

FIG. 13 is a fragmentary section taken on line 13—13 of FIG. 9, showing the detail of the switch contact plate seated in the face plate of the apparatus; and FIG. 14 is a showing of the circuit diagram used in the apparatus.

Referring to the drawings in detail, the novel flash card apparatus is indicated generally at 10 and comprises a casing 12 which will be constructed from molded plastic sheet, component elements or in any suitable manner. The apparatus includes a card viewing section 14, a selector switch assembly 15 accessible adjacent the card viewing section, card ejectment-and-orienting mechanism 16, and a card magazine 18.

Indicated at 20 is a typical card which includes suitable indicia, questions, etc., of varying complexity, depending upon the ability of the user of the apparatus.

The cards 20, as seen in FIG. 3, are rectangular and include on one side 22 a question or symbol "Q," a plurality of answers "A" presenting multiple-choice answers on the part of a user, and include a top edge 24, lower guide edge 26, and opposed, end, abutment edges 28 and 30. Formed in the lower edge 26 is a switch-contact, accommodating notch 32, which is in alignment with the correct answer A' to the question "Q," and which is blanked out to the user when the card is disposed in the viewing section 14, as will subsequently be described in detail.

Referring to FIG. 3A, the reverse side 22' of the card 20 is shown and the question Q' is visible when disposed in the viewing section 14 of the apparatus together with the multiple-choice answers A and correct answer A''. The notch 32 is so positioned on the card 20 as is the spacing of the switches of the selector switch assembly 15, that a single group of cards may be used to provide questions and answers on both sides.

The casing 12 comprises a rectangular base plate 34; see FIG. 4, and may have depending from the corners thereof suitably secured rubber foot elements 36. Formed on the base plate 34 is a suitable battery compartment 38 which opens into the bottom of the base plate to facilitate ready access to dry cell batteries 40 retained in a clamp 41. Although dry cell batteries are shown in the exemplary embodiment, any suitable means to energize a signal circuit may be utilized, for example, a conventional household current outlet and step-down transformer.

The battery compartment 38 includes strip conductors 42, 44 which are respectively engageable with the opposite poles of the batteries 40. The conductor 42 is connected by a lead 46 to audible signal means 48, such as a low voltage buzzer which is connected in parallel to a visual signal means 50. The signal means 48, 50 are connected through a lead 51, see FIG. 14, to a current conducting pivot shaft or bar 52 upon which a plurality of C-shaped contact plate elements 54 are longitudinally spaced and suitably journaled. The switch contact plates are normally biased toward an "open switch" position, as will subsequently be described, and in the path of movement of the upper terminal ends of the contact plates is a conductor plate 56 which is connected by a lead 58 to the batteries 40.

The audible signal means 48 is mounted on the base plate 34 in any suitable manner, for example, between spaced, vertically extending support posts 60 (only one shown) and a screw 62. The visual signal means 50 is mounted on a suitable support bracket 64 secured on the inner surface of the base plate 34 by means of a screw 66.

Projecting upwardly and along the forward edge 68 of the base plate 34 is the lower wall 70 of the housing which includes a rearwardly and upwardly projecting curved wall 72, terminating in a vertically extending portion 74; the portions 72 and 74 substantially overlying the base plate 34. The portion 72 has formed therein a transverse aperture 76 which over-lies the visual signal means 50, and a suitable colored and translucent lens element 78 may be secured in the aperture 78.

Upon considering FIGS. 1, 2 and 4, the orientation of the viewing section 14 will be noted to be at one side of the housing 12 and the card magazine is horizontally spaced therefrom. Further, the switch assembly is disposed beneath the viewing section 14 in a readily accessible position above the wall 72.

The wall 72 includes a plurality of horizontally spaced slots or apertures 80 each accommodating therein a portion of one of the C-shaped contact plates 54. The switch assembly 15 comprises an elongated support block 82, constructed from an insulating material and suitably secured on the inner surface of the base plate 34 in parallel relation to and spaced rearwardly from the slots 80. The block 82 has extending longitudinally therethrough the current conducting, pivot shaft 52, previously mentioned with respect to FIG. 14 showing the wiring diagram for the audible and visual signal means. The block 82 includes a plurality of upwardly opening, longitudinally spaced slots 84, in alignment with the slots 80 and through which the shaft 52 extends. Formed in the block 82 in communication with the slots 84 are recess portions 86 in which are received one end of a compression spring element 88, the other end of the springs 88 each engaging one of the contact plates 54 and biasing it into a "open-switch" position as illustrated by the solid lines of FIG. 5.

The contact plates 54 include a forward terminal end portion 90 which extends vertically through the slots 80 and to which is secured a button or key element 92. The other terminal end 94 of the plates 54, projects forwardly as seen in FIGS. 4 and 5, and when one of the buttons 92 is depressed in the manner indicated by the phantom lines of FIG. 5, the terminal end 94 will be moved forwardly into a circuit closing position with respect to the conductor plate 56.

The housing 12 includes parallel side walls 96, 98 secured to the base plate 34 and an upwardly and inwardly curved rear wall 100. Extending forwardly and upwardly from the upper edge 102 of the rear wall 100 is a top plate 104 which includes a rectangular aperture 106, see FIG. 2, overlying the card magazine 18 to permit ready access to the card magazine for inserting a new supply of flash cards 20.

Removably secured on the housing 12 by means of screws 108, or the like, is an angularly disposed face plate indicated generally at 110 which will dispose the viewing section 14 in an optimum viewing position with respect to a user's eyes. Formed integral with the face plate and projecting rearwardly therefrom is a rectangular, open topped magazine well 112, the rear wall 114 thereof abutting the inner surface of the upper portion of rear wall 100 of the housing, see FIG. 4. The walls 114 and 100 include a communicating, central aperture 116, 118, respectively, through which an intermediate portion of a rod element 120 extends. The rod element 120 has a knob element 122 suitably secured on one end thereof. The card well 112 includes spaced, parallel side walls 124, 126, the spacing of the inner surfaces thereof being substantially equal to the width of the cards 20 and the well 112 is disposed normal to the plane of the face plate 110. Reciprocally supported transversely of the card well 112, between the inner surfaces of the side walls 124, 126 is a rectangular pusher plate 128 to which the inner end 130 of a rod element 120 is suitably secured; see FIG. 4. Circumposed about the rod 120 in abutting engagement with the opposed surfaces of the rear wall 114 of the card well 112 and the pusher plate is a compression spring 132 which urges the pusher plate toward the face plate 110 to apply a biasing force on the cards 120. The knob element 122 may be grasped and pulled rearwardly to draw the pusher plate 128 toward the wall 114 against the pressure of spring 132 in order to replenish the supply of cards 120. The top wall 104 includes a pair of depending, parallel orienting or guide plates 134, 136, see FIG. 7, to engage the outer surface of the card well 112. Fixed to the rear surface of the pusher plate 128, adjacent the side edges thereof, are a pair of mounting blocks 138, 140 which have extending therethrough guide screws 142, 144, respectively, which are received in elongated slots 146 formed in the side walls 124, 126; see FIGS. 4 and 7. The slots 146 are parallel to the bottom wall 148 of the card well 112 and aid to maintain the pusher plate parallel to the face plate 110 and normal to the bottom wall 148.

The face plate 110 comprises a juxtaposed outer and inner plate 150 and 152, respectively, the plates being spaced apart substantially the same thickness as a single card 20 and forming a card guiding passage or channel 154 extending from the inner end of the card well 112 and opening at the left hand edge 156 of the face plate to provide a card-ejectment opening as indicated at 158 in FIGS. 8, 9 and 11. The inner surface 160 of the outer plate 150 defines the end of the card well 112 and the plate 152 includes a rectangular aperture 162 communicating with the card well for receiving a single card therein. The outer plate 150 will be of a material to blank out the indicia on the cards 20 and has a rectangular aperture therethrough which forms the viewing section 14. The lower edge 165 of the aperture 164 terminates above the lower card guide surface 166 of the guide passage 154 to blank out the notch 32 but yet permit a user to observe the question "Q" and answers A and A'.

The plate 150 has recessed therein, along the lower guide edge 166 of the card guide passage 154, see FIG. 13, the conductor plate 56, and the plate 152 has a plurality of longitudinally spaced, transverse apertures 168 formed therein. The apertures 168 are spaced from the conductor plate 56 a distance sufficient to permit a card 20 to move therebetween, and each aperture 168 will be in alignment with the contact end 94 of one of the switch plates 54.

When a card 20 is properly oriented in the passage 154 and the aperture 164, one of the apertures 168 of the plate 152 will be in alignment with the notch 32 of the oriented card, the other apertures 168 being covered by solid portions of the card. When a user depresses the proper button 92 to move the corresponding switch plate 54 in alignment with the one aperture 168, corresponding to the correct answer to the question on the oriented card, the signal means 48 and 50 will be activated and the user will be apprized that the proper answer has been selected. Movement of any other switch plates will not close the circuit to the signal means. Any variety of questions and answers can be utilized on the cards 20, depending upon the age of the user and the subject matter being presented.

The apparatus is semi-automatic to the extent that after one card is viewed and the qeustion thereon is answered, the user of the apparatus can operate the card ejectment and orienting mechanism 16 to automatically dispose the next card in its oriented position with respect to the viewing aperture 164. As cards are automatically positioned in the card channel 154 due to the pressure imposed by the plate 128 and spring 132 acting thereon, the card orienting-and-ejectment mechanism, to be presently described, includes structure operative to engage the left hand edge of the forwardmost card in the card well 124, as viewed in FIGS. 8–10, and move it transversely of the card well, along the guide edge 166. The right hand edge of a succeeding card being moved into position, will engage the left hand edge of a card disposed in oriented relationship with respect to the viewing aperture 164 and switch plates 54, and the formerly oriented card will be moved out of the card-ejectment opening 158.

It will be noted that FIGS. 8–10 are views taken substantially on line 8—8 of FIG. 4, and thus these views show the rear surface of outer plate 150. Further, in order to facilitate the description of card orientation and ejectment, the card to be first moved into oriented position will be identified as C' and the succeeding card to be oriented and used to eject the first card C' will be identified as C".

The plate 150 includes on the inner surface thereof, adjacent the upper edge, an elongated, undercut guide passage 170 which has communicating therewith an elongated slot 172 extending transversely through the plate 150 below the upper guide edge 174 of the guide passage 170. The guide edge 174 extends upwardly at 176 to accommodate for vertical oscillation of an orienting dog element 178 intermediately pivoted at 180. The dog element includes a depending nose or hook portion 182 at one end and a lower cam edge portion 184 at the other end. Formed on the plate 150 and projecting laterally beneath the dog element 178 and disposed above the upper edge of a card moved through the guide channel 154 is an abutment element 186 which will engage the dog element 178 immediately behind the hook portion 182 as seen in FIG. 9.

The undercut groove 170 includes at the end opposite the portion 176 in which the dog element 178 is supported, a downwardly extending, angular portion 188 to facilitate reciprocable movement of the ejectment mechanism. The lower portion of the undercut guide passage 170 opens into the guide channel 154 and thus the upper edge of the cards 20 will be disposed adjacent the open lower portion of the passage 170, the passage 170 being closed by the inner plate 152. The plate 152 may have a passage portion (not shown) of the same configuration as the passage 170 of plate 150.

Reciprocably supported between the adjacent surfaces in the plates 150, 152, in the guide passage 170, is an elongated support bar or plate 190; see FIG. 8 which includes at one end a downwardly angled, camming nose portion 192 which will abuttingly engage the cam portion 184 of the dog element 178 and move therebeneath as seen in FIG. 9. When the dog element 178 is disposed in the position seen in FIG. 9, the nose portion 182 will extend into the path of travel of cards in guide channel 150 and engage the right hand edge of the card to orient the indicia and notch 32 in its proper relation with respect to the apertures 168, switch plates 54 and viewing aperture 164.

The slot 172 has extending therethrough a mounting screw 194 which is received in a suitably tapped aperture in the bar or plate 190, and a finger engageable knob 196 is fixed on the exposed end of the screw 194 and is accessible to a user facing the apparatus.

The bar 190 has formed therein a vertical groove or cut-out portion 198 including a vertical abutment shoulder 200 and a relieved portion 202. Mounted on a transverse pivot pin 204 is a gravity pawl element or finger 206 which will be effective to engage the left hand edge of a card as viewed in FIGS. 8 and 9, or which may ride on the upper edge of a card; see FIG. 10, when a second card is to be "picked" up by the finger and move an oriented card from the previously oriented position and out of the ejectment aperture 158. The lower guide edge 166 is downwardly angled at 208, below the nose 182 of the dog element 178, and to the left thereof; see FIGS. 8 and 9.

The angular, undersurface 210 of the nose 182, when subject to pressure from a card being moved out of oriented relation to the right of the viewing section, see FIGS. 8, 9 and 11, by a succeeding card, will provide means whereby the dog may move from the position shown in FIG. 9, to that shown in FIG. 8.

It will be noted that the dog element 178 cannot move counterclockwise from the position shown in FIG. 9, when the nose 192 of the bar 190 is disposed beneath the cam edge portion 184 of the dog element 178.

*Operation*

The knob 122 is moved rearwardly permitting a plurality of cards 20 to be inserted in the card well 124. The forwardmost card C'; see FIG. 8, will be forced into the guide channel 154 through aperture 162 of the plate 152. It will be noted that the spring urged plate 128 constantly imposes pressure on the unit of cards; see FIG. 4.

The bar 190 will be urged to the extreme right as viewed in FIGS. 1 and 2, thus function being permitted by the groove 170 and portions 188 and 202 permitting the pawl 206 to ride on the upper edge of the card C' or C" as shown in FIG. 10 to assume the position shown in FIGS. 8 and 9. When the pawl assumes the position shown in FIG. 8, the knob 196, and accordingly, the bar 190, are moved toward the viewing aperture 164. As the bar 190 moves to this position, the bar nose 192 moves beneath the cam edge 184 of the lock dog 178 causing the dog to rotate counterclockwise to position the nose 182 in the path of travel of the card C'. When this occurs, the notch 32 of the card will be in alignment with one of the apertures 168; see FIG. 9, and the notches 32 will not be visible to a user of the apparatus disposed in front of the angularly disposed face plate 110.

The user of the apparatus considers the question Q, the multiple-choice answers A and depressed the button 92 in alignment with the selected answer. If the correct answer is selected, the nose portion 94 of the selected switch plate 54 will extend through the notch 32 and aligned aperture 168 and the circuit to the signal means 48, 50 will be closed and the user will be apprised of the selection of the correct answer by activation of the signal means. The buttons or switch plates in alignment with incorrect answers will be "blanked out," i.e., the solid portions of the card disposed over the "incorrect" apertures 168 will prevent closing of the circuit to the signal means.

Although not shown, automatic counting means can be incorporated in the signal circuit in order to record the number of correct or incorrect answers selected.

After the use of card C' is no longer required, and the user of the apparatus desires to position card C" before the viewing aperture 164, the user moves the knob shown in dotted lines in FIG. 9, to the position shown in FIG. 8. It will be observed that card C" would have been moved into the guide channel 154 from the card well as soon as the card C' was moved to the position of FIG. 9.

As the bar is moved from its dog-locking position of FIG. 9 back toward that of FIG. 8, the lock nose 182 is still in the position of FIG. 9; however, the pawl will ride on the upper edge of card C" as seen in FIG. 10. When the knob 196 is moved to the extreme right hand position, the pawl 206 will be positioned behind the card edge of card C'', i.e., the same position previously attained with respect to card C'.

Leftward movement of card C'' results in the card engaging card C' and moving toward the ejectment aperture 158, the dog 178 will be returned to the position of FIG. 11. When the nose 194 engages the cam edge 184 of the dog 178, the dog nose 182 will engage the upper edge of card C' which has moved toward the ejectment aperture 158 but is still beneath the nose 184. When this occurs, the inclined angular portion 208 of the guide surface 166 of the guide channel 154 will permit the nose 182 to descend into the path of travel of the oncoming card C'' and engage the edge of card C' being ejected.

This entire procedure can be continued until the unit of cards is exhausted. The cards can then be inserted in reverse order in order to utilize the side 22' and observe the questions thereon.

It will be obvious to those skilled in the art that various changes may be made without departing from the spirit of the invention and therefore the invention is not limited to what is shown in the drawings and described in the specification but only as indicated by the scope of the appended claims.

What is claimed as new is as follows:

1. In flash card teaching apparatus comprising face plate means including card channel means; the improvement comprising card orienting means comprising a vertically pivotal dog element having a nose portion positionable in said card channel means in the path of travel of a card being transported, card-transport means comprising a manually operable bar reciprocably supported on said face-plate means, said bar including a cam-nose portion engageable with said dog element for pivoting and locking said dog element in the path of travel of a card in said channel means, said bar including a gravity responsive pawl element spaced from said cam-nose portion extendible into said channel means for abuttingly engaging a card disposed in said channel means.

2. In flash card apparatus comprising a housing having two adjacent, serially disposed sections and including a vertically disposed face plate means, card-channel means on said face plate means and extending along the plane thereof between said sections, one of said sections comprising card magazine means normal to said card-channel means and communicating therewith, the other of said housing sections including a card-viewing portion communicating with said card-channel for exposing indicia on a card and the improvement comprising switch means on said housing below said card-viewing portion including at least one switch element pivotally supported in said housing beneath said card channel means on a pivotal axis parallel to said card-channel, said switch element having a substantially U-shape and including a contact portion behind the face plate, within said housing and spaced from and extendible toward said card channel means and movable therethrough, said switch element including an operating portion extending out of said housing in alignment with said viewing portion, and means normally biasing the switch element contact portion away from said channel means.

3. The structure of claim 2 including card-transport means reciprocably supported for manual movement above said card-channel means substantially the length of said other housing section, said card-transport means comprising an elongated bar including a lateral abutment portion projecting into said card-channel for engagement with a card edge.

4. The structure of claim 3; said card channel means opening at one side edge of said face plate means for permitting a card disposed at said viewing portion to be ejected therethrough by a subsequently oriented card moved by said card transport means.

5. In flash card apparatus, the improvement comprising a face plate including a card channel disposed in the plane thereof and opening at one side edge thereof, a lower guide surface extending the length of said card channel, said face plate including a card-receiving aperture normal to one side of said face plate for receiving a card therein, said face plate including a card-viewing aperture normal to the side opposite said card-receiving aperture and longitudinally spaced from said card receiving aperture, and a manually operable card-transport mechanism reciprocally supported on said face plate and traversable along said card channel means between said card-receiving and card-viewing apertures, said transport mechanism including a support bar element extending parallel to and above said card channel, said bar including an abutment extending into said channel and traversable the length of said card-receiving aperture, said card-transport mechanism including a pivotal, gravity-responsible pawl element restrained in depending relation in said card channel adjacent said card-receiving aperture when moved from said card-receiving aperture toward said card-viewing aperture, said gravity responsive pawl being freely pivotal out of said card channel when moved from said card-viewing aperture toward said card-receiving aperture.

6. The structure of claim 5; said support bar element pivotally supporting said gravity-responsive pawl element at one end, said support bar element including a cam nose portion at the end opposite said gravity-responsive pawl element, said dog element being intermediately pivoted on an axis of rotation normal to said card channel and including a lower cam edge at one side of said axis of rotation and engageable by said cam nose portion, said dog element including a depending nose portion at the other side of said axis of rotation thereof and extendable into said card channel in response to engagement of said lower cam edge with said support bar cam nose.

7. In flash card apparatus, the improvement comprising a face plate including a card channel disposed in the plane thereof and opening at one side edge thereof, a lower guide surface extending the length of said card channel, said face plate including a card-receiving aperture normal to one side of said face plate for receiving a card therein, said face plate including a card-viewing aperture normal to the side opposite said card-receiving aperture and longitudinally spaced from said card-receiving aperture, and a manually operable card-transport mechanism reciprocably supported on said face plate and traversable along said card channel means between said card-receiving and card-viewing apertures, said transport mechanism including a support bar element extending parallel to and above said card channel, said bar including an abutment extending into said channel and traversable the length of said card-receiving aperture, said face plate including an elongated, longitudinally disposed transverse slot above said card-viewing aperture and defining the path of travel of said card transport means and opening into the same side of said face plate as said card-viewing aperture, and an operator handle secured to said support bar element and extending through said elongated, transverse slot whereby reciprocable movement of said operator permits cards to be moved in said card channel one-by-one from said card-receiving aperture to said card-viewing aperture.

8. The structure of claim 7 in which said face plate includes an electrical contact plate parallel to and at one side of said guide channel above said lower guide surface and below said card viewing aperture; and a manually operable switch assembly in said housing below said viewing aperture, said switch assembly including a pivot shaft of an electrical conducting material disposed below said guide channel within said housing, said switch assembly including electrical contact means pivotally mounted on said pivot shaft and including a manually displaceable finger-engageable portion exteriorly of said housing face plate means beneath said viewing aperture, said contact means including an electrical contact portion within said housing integral with said finger engageable portion and normally biased away from and engageable with said contact plate below said viewing aperture and above said lower guide surface.

9. The structure of claim 8 wherein said electrical contact means comprises a plurality of key elements in electrical contact with said pivot shaft and spaced along said card guide channel beneath said viewing aperture and mutually insulated from each other, each of said key elements including one of said contact portions for closing an electrical circuit between said pivot shaft and said conductor plate transversely of the lower guide surface of said card guide channel.

10. The structure of claim 8; wherein said card magazine comprises an upwardly opening well immediately behind said face plate, said well including side walls comprising inner surfaces coinciding with vertical end margins of said card inlet, and a pressure plate spring biased toward said card inlet and including portions guidingly supported in the side walls of said well for urging cards into said inlet.

11. In flash card teaching apparatus including a horizontal path of travel for cards to be oriented in a viewing portion and in which said cards include a portion through which an electrical contact can move; the improvement comprising an electrical signal circuit comprising in series a source of potential, electrically energized signal means and a normally open switch means, said switch means comprising a contact plate connected in series in said circuit and disposed at one side of the horizontal path of travel of cards to be oriented, an electrically insulated support disposed beneath said contact plate, at least one U-shaped contact plate pivotally mounted on said support, beneath said contact plate and said horizontal path of travel for cards, biasing means engaging said one U-shaped contact plate, said U-shaped contact plate including a vertically disposed contact disposed on one side of said path of travel for cards and spaced from said contact plate for movement through said path of travel to close said signal circuit, said U-shaped contact plate including a vertically depressible operating end portion, spaced from said contact plate at the side opposite that engageable by said contact, and a plurality of said U-shaped contact plates each similar to said one U-shaped contact plate and including a vertically disposed contact and vertically depressible operating end portion in the same oriented relationship as the corresponding portion of said first mentioned one switch, said contact plates being journaled on a current conducting rod, connected in series in said signal circuit and disposed parallel to said path of travel for said cards, said contacts being disposed at one side of said first mentioned contact plate and said operating end portions being disposed at the opposite side of said first mentioned contact plate.

References Cited in the file of this patent

UNITED STATES PATENTS

| | | |
|---|---|---|
| 1,877,406 | Kaufmann | Sept. 13, 1932 |
| 2,564,089 | Williams et al. | Aug. 14, 1951 |
| 2,645,869 | Cook | July 21, 1953 |
| 2,720,038 | Clark | Oct. 11, 1955 |
| 2,904,914 | Trubert | Sept. 22, 1959 |
| 2,965,975 | Briggs | Dec. 27, 1960 |